US006508904B1

(12) United States Patent
Charley

(10) Patent No.: US 6,508,904 B1
(45) Date of Patent: Jan. 21, 2003

(54) WEB PRINTING PROCESS FOR LABELS

(75) Inventor: Richard A. Charley, Woodbury, MN (US)

(73) Assignee: The Miner Group, Limited, Minneapolis, MN (US)

( * ) Notice: Subject to any disclaimer, the term of this patent is extended or adjusted under 35 U.S.C. 154(b) by 69 days.

(21) Appl. No.: 09/587,698

(22) Filed: Jun. 5, 2000

Related U.S. Application Data

(62) Division of application No. 09/140,946, filed on Aug. 27, 1998, now Pat. No. 6,153,279.

(51) Int. Cl.[7] ................................ B32B 31/00

(52) U.S. Cl. ................ 156/249; 156/253; 156/268; 156/269; 156/277; 40/124.04; 40/638; 283/70; 283/81; 283/101; 283/109

(58) Field of Search ................ 156/249, 253, 156/269, 277, 268; 283/70, 81, 83, 94, 98, 101, 109; 40/638, 124.04; 428/40.1, 41.8, 42.1, 900

(56) References Cited

U.S. PATENT DOCUMENTS

| | | | | | |
|---|---|---|---|---|---|
| 3,684,869 | A | * | 8/1972 | Reiter | 235/61.12 M |
| 4,098,935 | A | * | 7/1978 | Knudsen | 428/40 |
| 4,837,956 | A | | 6/1989 | Dolence | 40/675 |
| 5,284,363 | A | * | 2/1994 | Gartner et al. | 283/81 |
| 5,458,282 | A | | 10/1995 | Martin | 229/92.8 |
| 5,482,779 | A | * | 1/1996 | Bausewein et al. | 428/488.4 |
| 5,727,818 | A | | 3/1998 | Schmeida | 283/81 |
| 5,804,271 | A | | 9/1998 | Barry | 428/40.1 |

OTHER PUBLICATIONS

Technicote, Section 12, pp. 1–2 (Price List Effective Jul. 1997).

* cited by examiner

*Primary Examiner*—Linda Gray
(74) *Attorney, Agent, or Firm*—Gerald E. Helget; Nelson R. Capes; Briggs and Morgan

(57) ABSTRACT

A label for attachment to a substrate, including a flexible magnet having printed material on one surface. The label consists of a thin, flat, flexible magnet having a first surface and a second surface, printed material attached to the first surface of the flexible magnet, a transparent covering attached to the printed material, a clear base material attached to the second surface of the magnet, a clear film easily separable from the clear base material, an adhesive backing attached to the clear film, and a liner material covering the adhesive backing. The liner material may be removed from the adhesive backing whereby the label may be applied to a substrate by means of the adhesive backing. After separating the clear film and clear base material the clear base material covers the second surface of the magnet and the clear film covers the adhesive backing applied to the substrate.

4 Claims, 5 Drawing Sheets

WEB PRINTING PROCESS FOR LABELS

This is a divisional application of co-owned patent application Ser. No. 09/140,946, filed on Aug. 27, 1998, now U.S. Pat. 6,153,279.

BACKGROUND OF THE INVENTION

This invention relates to labels for attachment to substrates such as cereal boxes, and in particular to labels that include a flexible magnet with some printed material on its surface.

Small, flexible magnets with printed material on one surface are very popular with consumers, who use them as "refrigerator magnets" to hold cartoons, children's art work, bills to be paid, business cards, etc. on the home refrigerator. Such magnets often have advertising printed on their surface, which provides good exposure to the advertiser whenever the consumer uses the magnet.

Manufacturers of staple food items such as cereal also often include advertising on their packages. Cereal boxes and other such substrates therefore provide a good distribution medium for refrigerator magnets with advertising printed thereon. Refrigerator magnets may also be distributed on printed material such as insurance mailers.

There is a need for a label for substrates such as cereal boxes with a flexible magnet having printed material on one surface. The label must be easily manufactured in volume and must be easily applyable to the substrate. In addition, the magnet must be easily removable from the label without leaving exposed adhesive on either the magnet or on the substrate.

SUMMARY OF THE INVENTION

A label for attachment to a substrate, including a flexible magnet having printed material on one surface. The label consists of a thin, flat, flexible magnet having a first surface and a second surface, printed material attached to the first surface of the flexible magnet, a transparent covering attached to the printed material, a clear base material attached to the second surface of the magnet, a clear film easily separable from the clear base material, an adhesive backing attached to the clear film, and a liner material covering the adhesive backing. The liner material may be removed from the adhesive backing whereby the label may be applied to a substrate by means of the adhesive backing. After separating the clear film and clear base material the clear base material covers the second surface of the magnet and the clear film covers the adhesive backing applied to the substrate.

A principal object and advantage of the present invention is that the magnet can be easily applied to and easily removed from the substrate.

Another principal object and advantage of the present invention is that when the magnet is removed from the substrate, there is no exposed adhesive on either the magnet or the substrate.

Another principal object and advantage of the present invention is that the method of manufacturing, using flexographic printing, is much more efficient than offset printing, which has been traditionally used. Flexographic printing is faster, uses fewer passes, produces higher resolution, is less labor-intensive, and can produce more colors than offset printing.

Another object and advantage of the present invention is that it can use either pressure-sensitive label stock or less expensive non-pressure-sensitive paper stock.

DETAILED DESCRIPTION OF THE PREFERRED EMBODIMENTS

Figure 1:
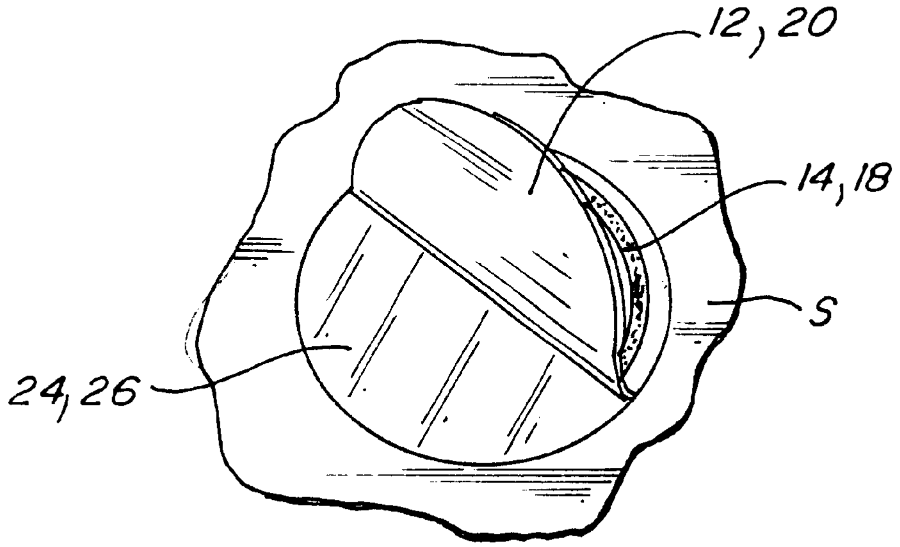
FIG. 1 is a perspective view of a first embodiment of the label of the present invention applied to a substrate.
Figure 2:
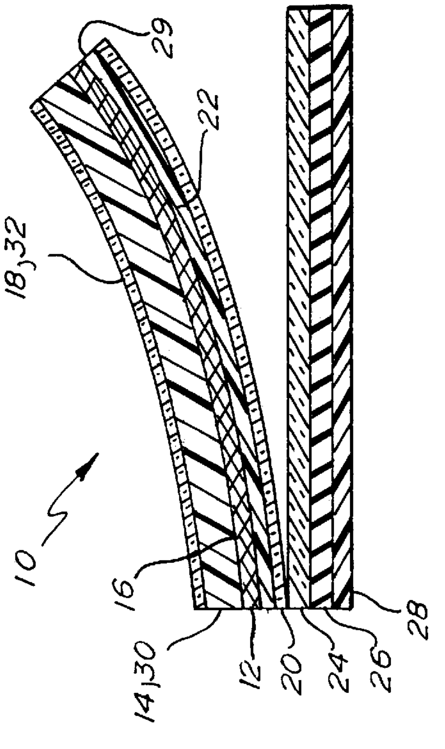
FIG. 2 is a schematic cross-section of a first embodiment of the label of the present invention showing the various layers and how the label may be separated from the substrate.

A first embodiment of the label 10 of the present invention is shown in FIGS. 1 and 2. The label 10 includes a thin, flat, flexible magnet 12, printed material 14 attached to a first surface 16 of the magnet 12, a transparent covering 18 attached to the printed material 14, a clear base material 20 attached to a second surface 22 of the magnet 12, a clear film 24 easily separable from the clear base material 20, an adhesive backing 26 attached to the clear film 24, and a liner 28 covering the adhesive backing 26.

The magnet 12 preferably has a thickness of about 12 mil. This thickness allows the magnet to be attached to the printed material in a flexographic printing process, as will be further described below.

The printed material 14 may comprise pressure-sensitive label stock 30. Suitable material which may be used as pressure-sensitive label stock is the TLP 840 U1/CSA Gloss White Polyester (Thermal Transfer) product from Tailored Label Products, Inc., Menomonee Falls, Wis. 53051-5658. This product has a facestock which is top-coated for thermal transfer printing and a firm acrylic adhesive covered by a paper liner. The printed material may be applied to the magnet by removing the liner from the printed material and pressing the exposed adhesive against the magnet, as will be further described below.

Alternatively, the printed material 14 may be any paper which may be printed upon and which is attached to the magnet 12 by glue.

Preferably, the transparent covering 18 is a clear laminate 32 which may be applied to the printed material 14 by an adhesive.

The clear base material 20 must adhere to but be easily separable from the clear film 24. A suitable material for both the clear base material and the clear film 24 is the TECHNICOTE MAGIC FILM™ available from Technicote, 222 Mound Ave., Miamisburg, Ohio 45342. The TECHNICOTE MAGIC FILM™ consists of two film layers that have been chemically bonded. A slight lifting pressure with a finger is enough to separate the two film layers.

The TECHNICOTE MAGIC FILM™ also provides the adhesive backing 26 and the liner 28. After separating the liner 28 from the adhesive backing 26, the label 10 may be applied to a substrate S.

A solvent base adhesive 29 may be used to attach the clear base material 20 to the magnet 12. Any solvent base adhesive may be used, such as the patterned adhesive available from Technicote for use with the TECHNICOTE MAGIC FILM™.

Figure 5:
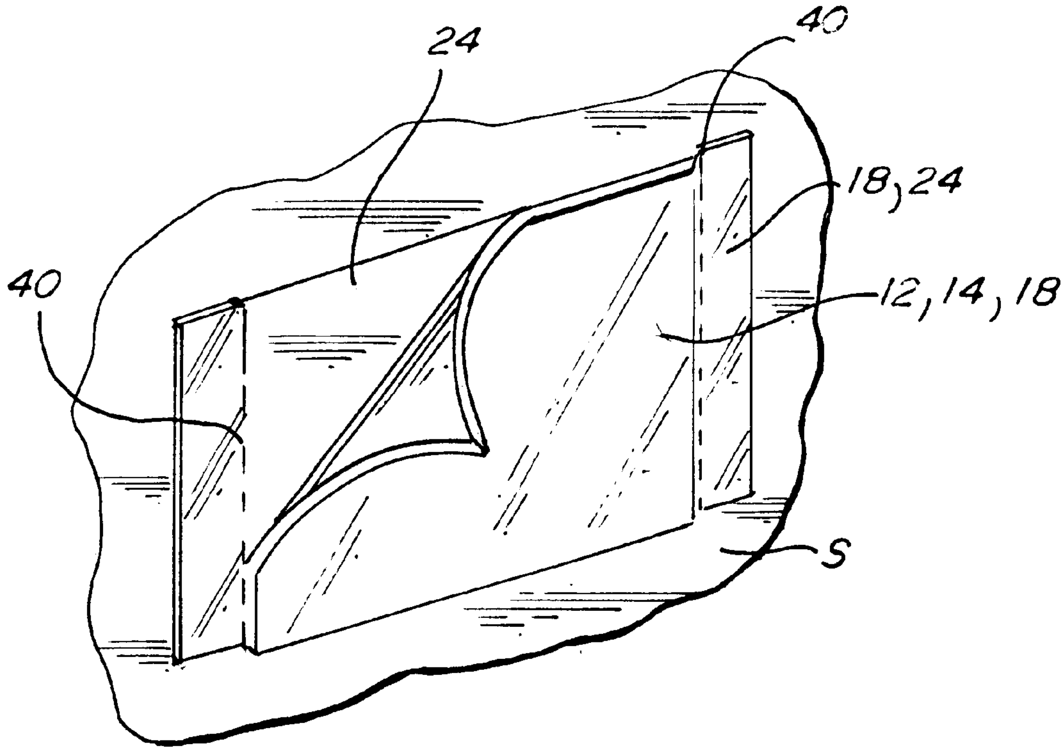
FIG. 5 is a perspective view of a second embodiment of the label of the present invention applied to a substrate.
Figure 6:
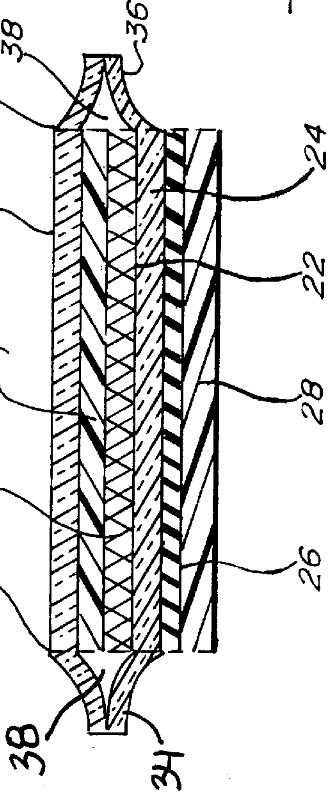
FIG. 6 is a schematic cross-section of a second embodiment of the label of the present invention showing the various layers and how the label may be separated from the substrate.

A second embodiment of the label 10 is shown in FIGS. 5 and 6. The label 10 again comprises the magnet 12, printed material 14, and transparent covering 18 as described above in regard to the first embodiment. The second embodiment varies in that there is no clear base material 20, but rather the clear film 24 is placed adjacent to, but not attached to the second surface 22 of the magnet 12. Also, the transparent covering 18 and the clear film 24 are attached to each other at their edges 34, 36 to form a pocket 38 enclosing the magnet 12 and the printed material 14.

In the second embodiment, a serration cut line 40 is made through the transparent covering 18 adjacent the edges 34, 36 on each side of the magnet 12 and printed material 14. A slight, upward twisting motion is enough to break the transparent covering 18 at the serration cut lines 40, thereby allowing the transparent covering 18, printed material 14, and magnet 12 to be removed.

As in the first embodiment, an adhesive backing 26 is attached to t he clear film 24 and a liner material 28 covers the adhesive backing 26. After separating the liner 28 from the adhesive backing 26, the label 10 may be applied to a substrate S. After separating the transparent covering 18 and the clear film 24 at the serration cut line 40, the clear film 24 continues to cover the adhesive backing 26 applied to the substrate S.

The printed material 14 may comprise pressure-sensitive label stock 30. Suitable material which may be used as pressure-sensitive label stock is the TLP 840 U1/CSA Gloss White Polyester (Thermal Transfer) product from Tailored Label Products, Inc., Menomonee Falls, Wis. 53051-5658. This product has a facestock which is top-coated for thermal transfer printing and a firm acrylic adhesive covered by a paper liner. The printed material may be applied to the magnet by removing the liner from the printed material and pressing the exposed adhesive against the magnet, as will be further described below.

Alternatively, the printed material 14 may be any paper which may be printed upon and which is attached to the magnet 12 by glue.

Preferably, the transparent covering 18 is a clear laminate 32 which may be applied to the printed material 14 by an adhesive.

Figure 3:
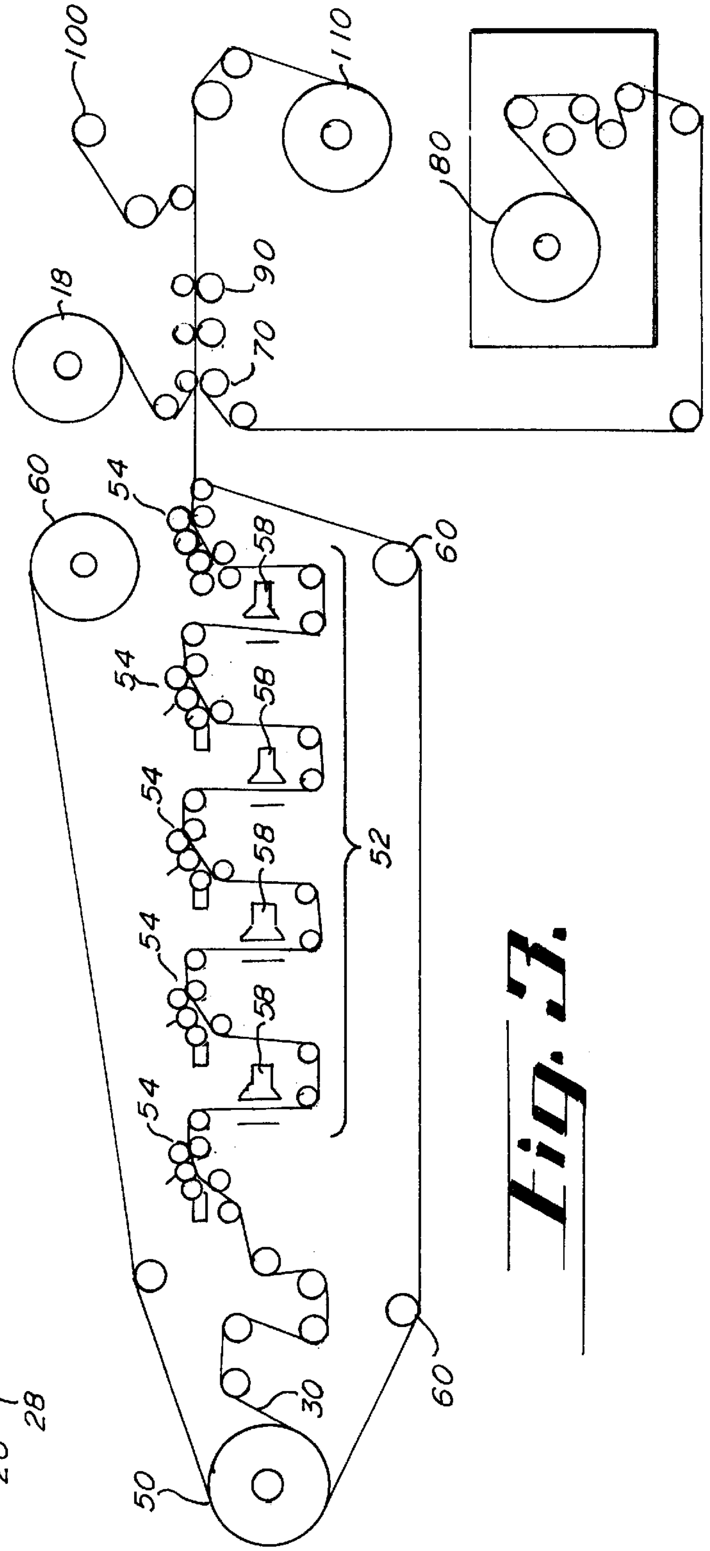
FIG. 3 is a schematic of a first embodiment of a method of manufacture of the label of FIG. 1.

A printing process for manufacturing the first embodiment of the label 10 is shown in FIG. 3.

A roll 50 of pressure-sensitive label stock 30 including a liner covering an adhesive feeds the pressure-sensitive label stock 30 into a flexographic printing press machine 52. A suitable machine is the WEBTRON™ 750 available from Webtron, 2030 W. McNab Road, Fort Lauderdale, Fla. 33309. The pressure-sensitive label stock 30 is continuously fed into the machine 52 and through its flexographic press stations 54. At each of the press stations 54, a different colored ink may be applied to the pressure-sensitive label stock 30. At each flexographic press station 54, the imprinted stock is run through that station's dryer 58 before being routed to the next press station 54

At the last press station 54, the liner is removed from the pressure-sensitive label stock 30, exposing the adhesive. The waste liner is then fed back through liner waste recovery rollers 60.

The pressure-sensitive label stock 30 with exposed adhesive is now fed into joining station 70, where the transparent covering 18 is applied to the printed stock 30. The magnet 12, clear base material 20, clear film 24, adhesive 26, and liner 28 are applied to the pressure-sensitive label stock 30, from a roll 80 which contains the magnet, clear base material, clear film, adhesive, and liner.

The finished labels 10 are then fed into a die-cut station 90 for cutting to the proper format for packaging, and waste from the die-cutting operation is wound onto waste rewind roller 100. The finished product is then wound onto product roller 110.

Figure 4:
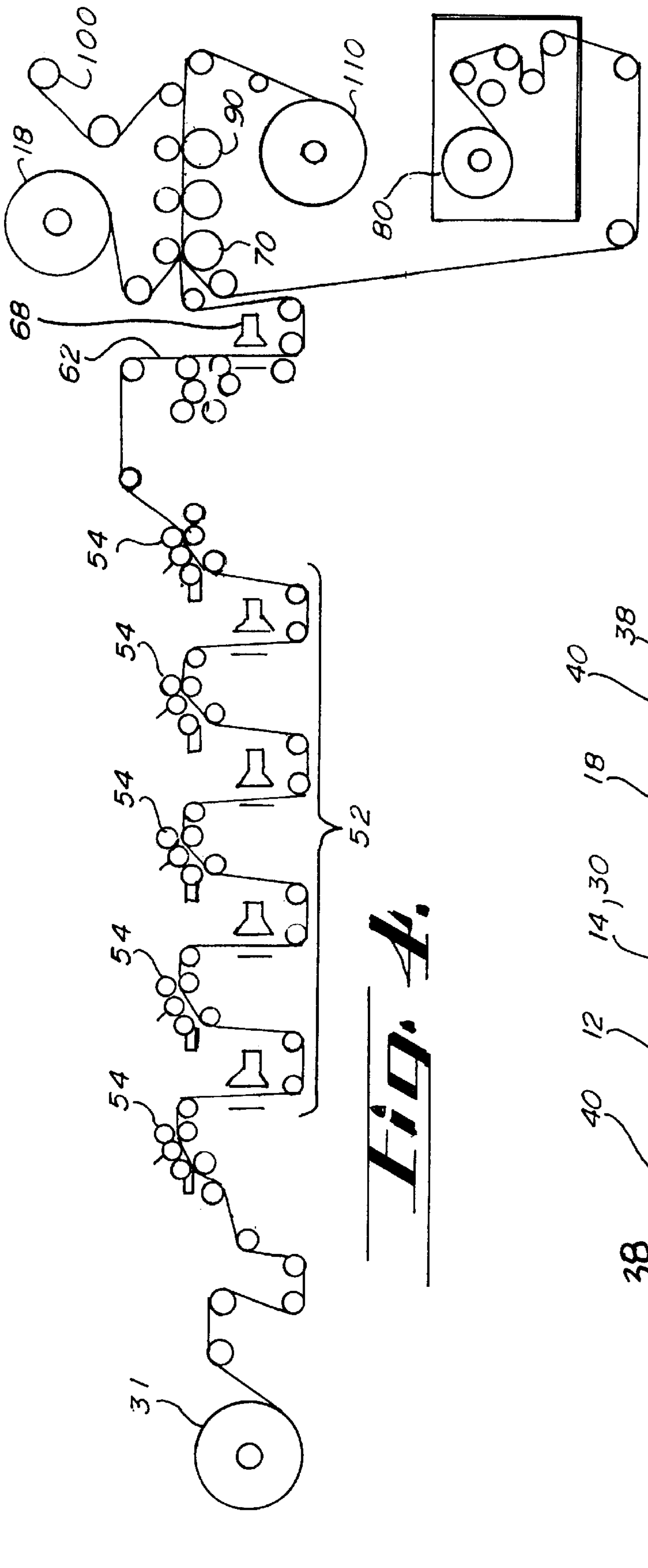
FIG. 4 is a schematic of a second embodiment of a method of manufacture of the label of FIG. 1.

A second printing process for making the labels 10 of the first embodiment is shown in FIG. 4. Here, plain paper stock 31 is fed through a flexographic printing machine 52 as described above. After the colors are printed on the paper at the various press stations 54, the printed paper stock enters a glue station 62, where a layer of glue is applied and partially dried by dryer 68. The paper with exposed glue then enters joining station 70, where the following layers are applied: the magnet 12, clear base material 20, clear film 24, adhesive 26, and liner 28 are applied to the paper 31, from a roll 80 which contains the magnet, clear base material, clear film, adhesive, and liner. Also, the transparent covering 18 is applied to the paper 31 with adhesive.

The finished labels 10 are then fed into a die-cut station 90 for cutting to the proper format for packaging, and waste from the die-cutting operation is wound onto waste rewind roller 100. The finished product is then wound onto product roller 110.

Figure 7:
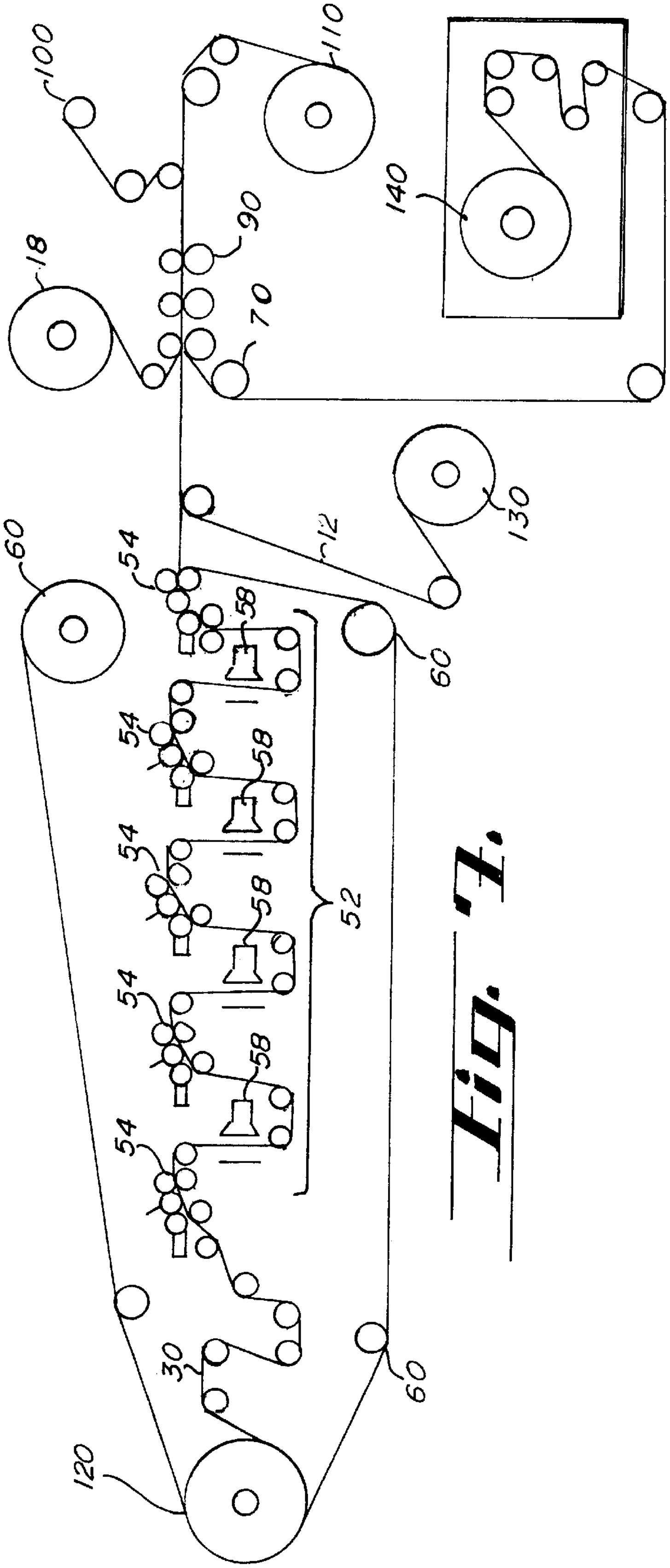
FIG. 7 is a schematic of a first embodiment of a method of manufacture of the label of FIG. 5.

A printing method for manufacturing the label 10 of the second embodiment is shown in FIG. 7.

A roll 120 of pressure-sensitive paper stock 30 including a liner covering an adhesive feeds the pressure-sensitive label stock 30 into a flexographic printing press machine 52. A suitable machine is the WEBTRON™ 750 available from Webtron, 2030 W. McNab Road, Fort Lauderdale, Fla. 33309. The pressure-sensitive label stock 30 is continuously fed into the machine 52 and through its flexographic press stations 54. At each of the press stations 54, a different colored ink may be applied to the pressure-sensitive label stock 30. At each flexographic press station 54, the imprinted stock is run through that station's dryer 58 before being routed t o the next press station 54

At the last press station 54, the liner is removed from the pressure-sensitive label stock 30, exposing the adhesive. The waste liner is then fed back through liner waste recovery rollers 60.

Next, a roll 130 of flexible magnets 12 is fed into the continuous feed of label stock 30, where the magnets are joined to the stock 30 through the exposed adhesive.

The pressure-sensitive label stock 30 and attached magnet is now fed into joining station 70, where the transparent covering 18 is applied to the printed stock 30 and the clear film 24, adhesive 26, and liner 28 are applied to the pressure-sensitive label stock 30 and magnet 12, from a roll 140 which contains the clear film, adhesive, and liner. The clear film 24 is adjacent to, but not attached, to the magnet 12. The edges 34, 36 of the transparent covering 18 and clear film 24 are joined, producing the pocket 38 containing the pressure-sensitive label stock 30 and the magnet 12.

The finished labels 10 are then fed into a die-cut station 90 for cutting to the proper format for packaging, including cutting of the serration cut lines 40, and waste from the die-cutting operation is wound onto waste rewind roller 100. The finished product is then wound onto product rollers 110.

Figure 8:
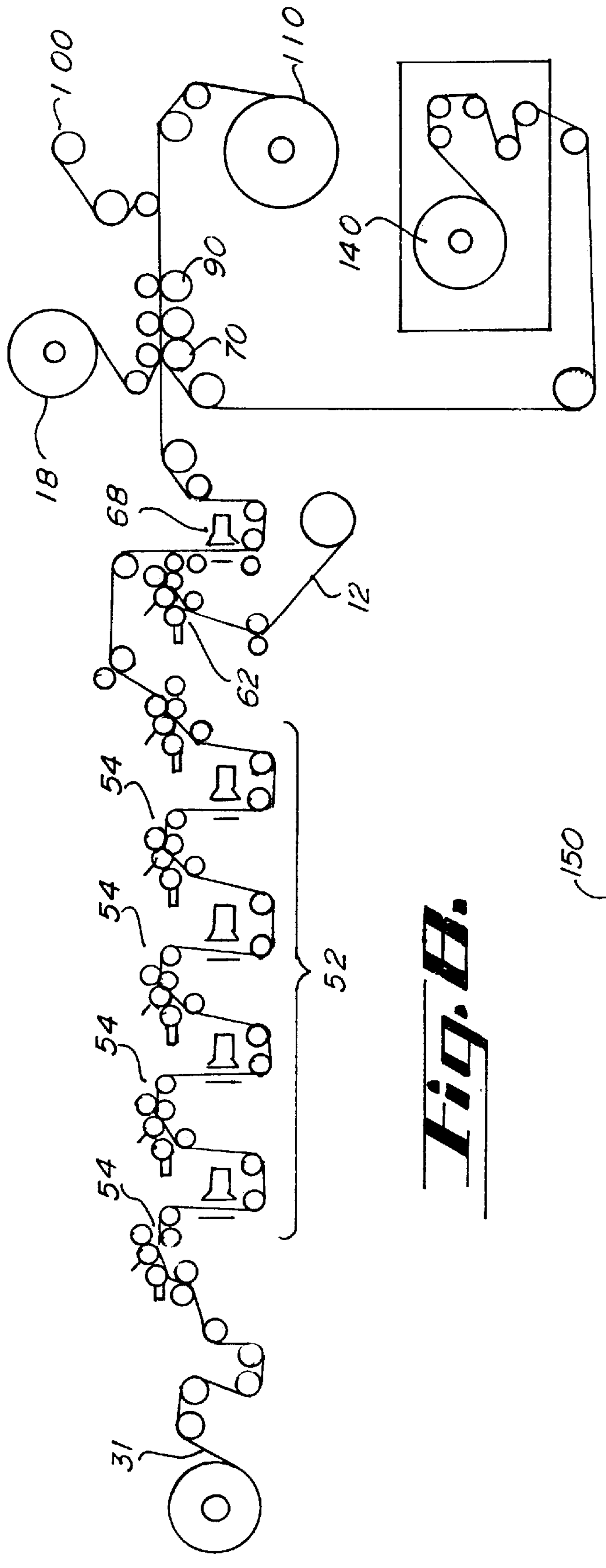
FIG. 8 is a schematic of a second embodiment of a method of manufacture of the label of FIG. 5.

A second printing process f or making the labels 10 of the second embodiment is shown in FIG. 8. Here, plain paper stock 31 is fed through a flexographic printing machine 52 as described above. After the colors are printed on the paper at the various press stations 54, the printed paper stock enters a glue station 62, where a layer of glue is applied, the magnets 12 are applied to the exposed glue, and the glue is dried by dryer 68. The paper with attached magnet 12 then enters joining station 70, where the transparent covering 18 is applied to the printed stock 30. The clear film 24, adhesive 26, and liner 28 are applied to the pressure-sensitive label stock 30 and magnet 12, from a roll 140 which contains the clear film, adhesive, and liner. The edges 34, 36 of the transparent covering 18 and clear film 24 are joined, producing the pocket 38.

The finished labels 10 are then fed into a die-cut station 90 for cutting to the proper format for packaging, including cutting of the serration cut lines 40, and waste from the die-cutting operation is wound onto waste rewind roller 100. The finished product is then wound onto product roller 110.

Figure 9:
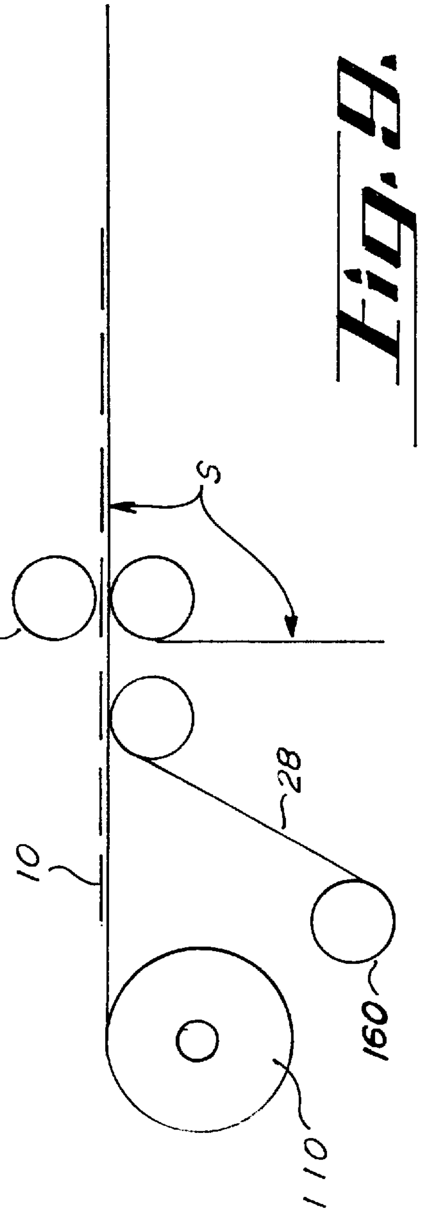
FIG. 9 is a schematic showing how the labels of the present invention may be applied to the substrate.

To apply the labels 10 to the substrate S (such as a cereal box), FIG. 9 shows the labels 10 on a roll 110 being fed to a product joining station 150, where the liner 28 is stripped off the labels and rewound onto rewind roller 160. The exposed adhesive 26 is then wedded to the substrate S.

After the consumer purchases the substrate S, such as a cereal box, the magnet 12 with printed material 14 may be removed from the label 10 of the first embodiment by simply lifting up on the magnet 12, breaking the bond between the clear film 24 and clear base material 20. The clear base material comes away with the magnet while the clear film is left on the substrate S. The result is no exposed adhesive on either the magnet 12 or the substrate S.

In the case of the second embodiment, to remove the magnet 12, the consumer lifts up and twists the transparent covering 18, breaking off the transparent covering 18 at the serration cut lines 40.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A process of manufacturing a label for attachment to a substrate, the label including a flexible magnet having printed material on one surface, the method comprising the steps of:

(a) continuously feeding pressure-sensitive label stock having an adhesive and a liner covering the adhesive into a flexographic printing machine;

(b) printing on one side of the pressure-sensitive label stock at a plurality of press stations within the flexographic printing machine and drying the label stock at each press station;

(c) removing the liner from the pressure-sensitive label stock, thereby exposing the adhesive;

(d) applying a transparent covering to the pressure-sensitive label stock;

(e) applying a thin, flexible magnet; a clear base material; a clear film; an adhesive; and a liner to the pressure-sensitive label stock by means of the exposed adhesive, thereby producing a continuous web; and (f) die-cutting the continuous web to form finished labels.

2. A process of manufacturing a label for attachment to a substrate, the label including a flexible magnet having printed material on one surface, the method comprising the steps of:

(a) continuously feeding paper label stock into a flexographic printing machine;

(b) printing on one side of the paper label stock at a plurality of press stations within the flexographic printing machine and drying the label stock at each press station;

(c) applying a layer of glue to the paper label stock;

(d) applying a transparent covering to the paper label stock;

(e) applying a thin, flexible magnet; a clear base material; a clear film; an adhesive; and a liner to the paper label stock by means of the exposed adhesive, thereby producing a continuous web; and (f) die-cutting the continuous web to form finished labels.

3. A process of manufacturing a label for attachment to a substrate, the label including a flexible magnet having printed material on one surface, the method comprising the steps of:

(a) continuously feeding pressure-sensitive label stock having an adhesive and a liner covering the adhesive into a flexographic printing machine;

(b) printing on one side of the pressure-sensitive label stock at a plurality of press stations within the flexographic printing machine and drying the label stock at each press station;

(c) removing the liner from the pressure-sensitive label stock, thereby exposing the adhesive;

(d) applying a thin, flexible magnet to the pressure-sensitive label stock by means of the exposed adhesive;

(e) applying a transparent covering to the pressure-sensitive label stock;

(f) applying a clear film; an adhesive; and a liner to the pressure-sensitive label stock so that the clear film is adjacent to but not attached to the magnet;

(g) joining the edges of the transparent covering and the clear film, thereby producing a pocket containing the pressure-sensitive label stock and the magnet;

(h) cutting serration lines through the transparent covering adjacent the edges of the transparent covering, thereby producing a continuous web; and (i) die-cutting the continuous web to form finished labels.

4. A process of manufacturing a label for attachment to a substrate, the label including a flexible magnet having printed material on one surface, the method comprising the steps of:

(a) continuously feeding paper label stock into a flexographic printing machine;

(b) printing on one side of the paper label stock at a plurality of press stations within the flexographic printing machine and drying the label stock at each press station;

(c) applying a layer of glue to the paper label stock;

(d) applying a thin, flexible magnet to the paper label stock by means of the exposed glue;

(e) applying a transparent covering to the paper label stock;

(f) applying a clear film; an adhesive; and a liner to the paper label stock so that the clear film is adjacent to but not attached to the magnet;

(g) joining the edges of the transparent covering and the clear film, thereby producing a pocket containing the paper label stock and the magnet;

(h) cutting serration lines through the transparent covering adjacent the edges of the transparent covering, thereby producing a continuous web; and (i) die-cutting the continuous web to form finished labels.

* * * * *